Oct. 13, 1931.  I. C. BAKER  1,826,977

SPRAYING DEVICE

Filed June 10, 1930

Inventor
Irving C. Baker,
By Dodge and Sons
Attorneys

Patented Oct. 13, 1931

1,826,977

UNITED STATES PATENT OFFICE

IRVING C. BAKER, OF YORK, PENNSYLVANIA, ASSIGNOR TO YORK ICE MACHINERY CORPORATION, OF YORK, PENNSYLVANIA, A CORPORATION OF DELAWARE

SPRAYING DEVICE

Application filed June 10, 1930. Serial No. 460,186.

This invention relates to spraying devices, and provides a spray nozzle specially adapted for use in air washing, air conditioning, and like installations.

Generally stated, the purpose of the invention is to produce a nozzle in which the spray-producing parts separate automatically as the water is turned off and on to permit flushing of the nozzle, and to combine with a structure of this general character, various features conducive to simplicity in manufacture and ease of maintenance.

Another important feature is the provision of simple means for adjusting the fineness of the spray without dismounting or dismantling the nozzle.

A preferred embodiment of the invention is illustrated in the accompanying drawings, in which,—

Fig. 2 is a similar view showing the position assumed by the parts when the water is turned on.

Figure 1:
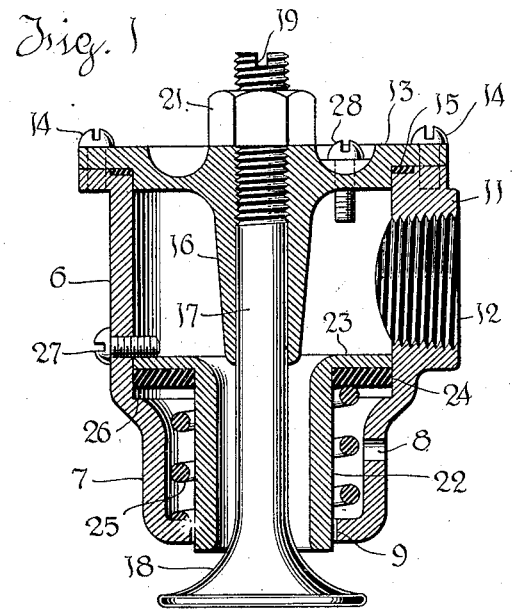
Fig. 1 is an axial section through the nozzle, in the position which it assumes when the water is turned off.
Figure 2:
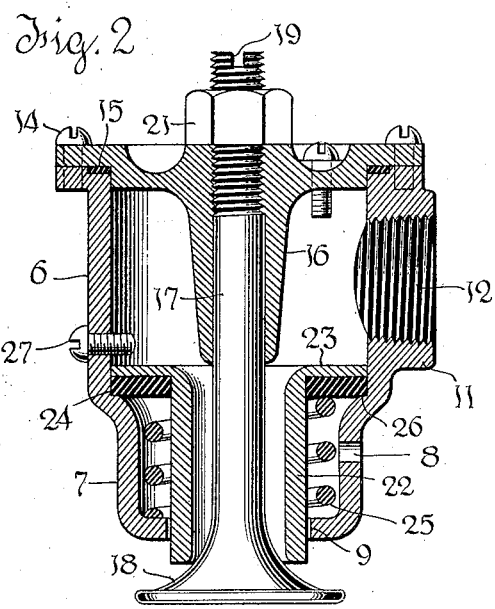

The body of the spray nozzle is indicated at 6 and is cylindrical in its general configuration, with a reduced extension 7 having a lateral vent port 8. At the forward end of the extension 7 is a circular opening or guideway 9. On the side of the cylindrical portion of the body 6 is a boss 11, having pipe threads, as indicated at 12. The rear end of the body 6 is closed by a cap 13, held in place by screws 14 against a gasket ring 15. Projecting inward from the center of the cap 13 is a hub or sleeve portion 16, which is axially bored and which is threaded at its rear end.

Mounted in the hub 16 and threaded into the threaded portion thereof, is a stem 17 which carries at its forward end a flaring deflector 18. The rear end of the stem 17 is provided with a screw-driver slot 19 by which it may be turned to adjust the stem 17 forward and back. The threaded end of the stem projects and receives a lock nut 21 which clamps the parts in adjusted relation.

Guided in the interior of the body 6, and in the guide opening 9, is a shiftable nozzle portion made up of a sleeve 22 having an outwardly extending flange 23 at its rear end. This flange 23 makes a free sliding fit in the interior of the cylindrical body 6. The interior of the body is machined to insure smooth sliding action of the parts.

Seated against the front face of the flange 23 is a gasket 24. A compression coil spring 25 encircles the sleeve 22 and seats at its forward end against the forward end of the reduced extension 7, and seats at its rear end on the front face of the gasket 24. At the junction of the body 6 and extension 7 there is a seating shoulder 26, which the gasket engages when it is forced forward. Rearward motion of the sleeve 22 is limited by one or more stop screws 27. An opening is formed in the head 13 and is normally closed by a plug screw 28. This opening is merely for the insertion of a push rod which is used to force the tube 22 forward while the stem 17 is being adjusted to give the desired fineness of spray. This adjustment is made while the water is turned off, and it is therefore necessary to provide means to force the sleeve 22 forward to its operative position while the adjustment is being made. When the device is in operation, the screw 28 closes the hole tightly.

The provision of the gasket 24 and its arrangement in such manner that it seals the joint between the flange 23 and the body 6 when the sleeve is in its forward or operative position, permits relatively loose fitting of the sleeve 22 in the guide 9 and of the flange 23 in the cylindrical portion of the body 26. This is a useful feature, because it reduces the tendency of these parts to stick.

When the water pressure is low, as it is when the water is being turned on and off, the spring 25 moves the sleeve 22 rearward and provides a large annular orifice between the end of the sleeve 22 and the flaring head 18. At such times the nozzle is flushed and cleared of any pieces of scale or other solid particles which are likely to accumulate during the operation of the nozzle. When the nozzle is under full pressure, the sleeve 22 moves upward until the gasket 24 seats on the shoulder 26, at which time a minute annular orifice is offered between the outer end of the sleeve and the flaring spray member 18.

The whole device is preferably constructed of bronze or other non-corrosive metal.

The feature of adjustment of the fineness of the spray is an important one not only to the adaptability of the nozzle to special uses, but also to correction for erosion incident to long use.

What is claimed is:—

1. In a spraying device, the combination of a body having a connection for delivering liquid to the body; a spray head fixedly mounted on said body; an abutment associated with said body and movable in a forward direction toward said spray head by fluid pressure in the body; means for limiting such motion; yielding means opposing said motion; and a nozzle carried by said abutment leading from the space within the body and shiftable by forward movement of the abutment into coactive relation with said spray head.

2. In a spraying device, the combination of a body having a connection for delivering liquid to the body; a spray head fixedly mounted on said body; an abutment associated with said body and movable in a forward direction toward said spray head by fluid pressure in the body; means for limiting such motion; yielding means opposing said motion; a nozzle carried by said abutment leading from the space within the body and shiftable by forward movement of the abutment into coactive relation with said spray head; and means for adjusting said spray head toward and from said body.

3. In a spraying device, the combination of a body having a cylinder; a connection for supplying to said body the liquid to be sprayed; a spray head fixedly mounted on said body; a combined piston and nozzle slidable in the cylinder toward and from said spray head; and a spring urging said piston away from said spray head.

4. In a spraying device, the combination of a body having a cylinder and a shoulder defining the forward margin thereof; a connection for supplying to said body the liquid to be sprayed; a spray head having a stem fixedly mounted on said body; a combined piston and nozzle freely slidable in the cylinder toward and from said spray head and encircling said stem; means for forming a seal between said piston and shoulder when the piston is in its forward position; and a spring urging said piston in a rearward direction.

5. In a spraying device, the combination of a body having a cylinder and a shoulder defining the forward margin thereof; a connection for supplying to said body the liquid to be sprayed; a spray head having a stem fixedly mounted on said body; a combined piston and nozzle freely slidable in the cylinder toward and from said spray head and encircling said stem; means for forming a seal between said piston and shoulder when the piston is in its forward position; a spring urging said piston in a rearward direction; and means for adjusting the position of said spray head relatively to said body.

In testimony whereof I have signed my name to this specification.

IRVING C. BAKER.